(12) United States Patent
Akiba

(10) Patent No.: US 9,460,297 B2
(45) Date of Patent: Oct. 4, 2016

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Tomohiro Akiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/948,559

(22) Filed: Jul. 23, 2013

(65) Prior Publication Data

US 2014/0032936 A1 Jan. 30, 2014

(30) Foreign Application Priority Data

Jul. 25, 2012 (JP) ................................. 2012-164610

(51) Int. Cl.
*H04L 12/40* (2006.01)
*G06F 21/60* (2013.01)

(52) U.S. Cl.
CPC .................................. *G06F 21/602* (2013.01)

(58) Field of Classification Search
CPC .................................................. H04L 67/2842
USPC ............................... 726/26–30; 713/192–193
See application file for complete search history.

(56) References Cited

U.S. PATENT DOCUMENTS

| 5,950,013 | A | * | 9/1999 | Yoshimura et al. ............... 710/5 |
| 6,119,239 | A | * | 9/2000 | Fujii .............................. 713/320 |
| 2001/0028523 | A1 | * | 10/2001 | Moro et al. ..................... 360/53 |
| 2007/0101158 | A1 | * | 5/2007 | Elliott ........................... 713/193 |

FOREIGN PATENT DOCUMENTS

| JP | 2001202167 A | 7/2001 |
| JP | 2008-204459 A | 9/2008 |
| JP | 2010214904 A | 9/2010 |

* cited by examiner

*Primary Examiner* — Josnel Jeudy
(74) *Attorney, Agent, or Firm* — Canon U.S.A., Inc. IP Division

(57) ABSTRACT

An information processing apparatus includes a volatile storage unit, nonvolatile storage unit, and control unit configured, in a case where a factor to shift the information processing apparatus to a state in which power supply to the volatile storage unit is stopped exists, to encrypt and store information, stored in a specific region in the volatile storage unit, in the nonvolatile storage unit, and to store, in the nonvolatile storage unit in unencrypted form, information stored in a region other than the specific region, and configured, in a case where a factor to shift the information processing apparatus to a state in which power is supplied to the volatile storage unit exists, to decrypt and store the encrypted information, stored in the nonvolatile storage unit, in the volatile storage unit, and to store, in the volatile storage unit, the unencrypted information stored in the nonvolatile storage unit.

10 Claims, 6 Drawing Sheets

INFORMATION PROCESSING APPARATUS, CONTROL METHOD FOR INFORMATION PROCESSING APPARATUS, AND STORAGE MEDIUM

BACKGROUND OF THE INVENTION

1. Field of the Invention

The present invention relates to an information processing apparatus for executing an application to perform data processing, a control method for the information processing apparatus, and a storage medium.

2. Description of the Related Art

An increase in the size of software, which configures the system of a data processing apparatus, leads to a tendency to increase the time from the moment the user turns on the power switch to the moment the system is started (system startup time). As one of the solutions to such increase in the startup time, the hibernation technology is used.

Hibernation refers to the technology that is implemented as follows. The information, stored in a volatile storage device (memory) of the system at an arbitrary time, is saved to a nonvolatile storage device, such as a hard disk drive (HDD), a solid state drive (SSD), and a universal serial bus (USB) memory. Next time, when the system is started, the saved information is written back to the volatile storage device to restore the system state to the "state at the time of save".

The information, which is used when the system state is shifted to the "state at the time of save", in the memory may include confidential information such as a password. If hibernation is not used, the information is erased when the power of the apparatus is turned off and, therefore, it is very difficult for a third party to acquire the information.

However, when hibernation is used, the information is stored in the nonvolatile storage device. This means that, when the nonvolatile storage device is a removable device such as an HDD, the confidential information is more likely to be acquired by a third party.

To address the problem, Japanese Patent Application Laid-Open No. 2008-204459 discusses a technology that provides a data encryption processing unit and a data decryption processing unit within a system-on-chip (SoC) in a data processing apparatus. The data encryption processing unit encrypts the state of a processing circuit when a hibernation signal is received from an external source, and the decryption processing unit decrypts the encrypted state when the wake signal is received, to protect confidential information.

Another solution is an encryption method, conforming to Linux (registered trademark) Unified Key Setup (LUKS), in which a file system in a nonvolatile storage device is stored as an encrypted file system. When data is stored into the nonvolatile storage device, this encryption method encrypts all of the information in the memory via software.

Hardware-based encryption, such as the SoC described above, requires addition of the encryption mechanism to the internal of the SoC of the information processing apparatus, involving an additional cost.

Software-based encryption such as LUKS performs processing for the entire memory of the data processing apparatus. The additional processing time for encryption and decryption is less likely to contribute to a reduction in the startup time required for the information processing apparatus.

On the other hand, when considering the memory that is to be encrypted, a general-purpose information processing apparatus (personal computer (PC)), in which various applications operate and store data in the memory, cannot identify an area that need not be encrypted. As a result, the information processing apparatus must encrypt the entire memory of the information processing apparatus, thus making it impossible to reduce the encryption processing time.

Since the entire memory of the information processing apparatus is to be encrypted, there is also a problem that, unless an appropriate encryption algorithm is used, the encryption algorithm can be identified from encrypted data patterns.

SUMMARY OF THE INVENTION

The present invention is directed to an information processing apparatus that can quickly save, when a factor exists that causes the information processing apparatus to shift from the normal power state to the power saving state, the information, which indicates the state of the information processing apparatus and is stored in a specific region of a volatile storage unit, to a nonvolatile storage unit while maintaining confidentiality.

According to an aspect of the present invention, an information processing apparatus includes a volatile storage unit, a nonvolatile storage unit, and a control unit configured, in a case where a factor to shift the information processing apparatus to a state in which power supply to the volatile storage unit is stopped exists, to encrypt information stored in a specific region in the volatile storage unit, and store the encrypted information in the nonvolatile storage unit, and to store, in the nonvolatile storage unit in unencrypted form, information stored in a region other than the specific region in the volatile storage unit, and configured, in a case where a factor to shift the information processing apparatus to a state in which power is supplied to the volatile storage unit exists, to decrypt the information stored in the nonvolatile storage unit in encrypted form, and store the decrypted information in the volatile storage unit, and to store, in the volatile storage unit, the information stored in the nonvolatile storage unit in unencrypted form.

Further features of the present invention will become apparent from the following description of exemplary embodiments with reference to the attached drawings.

DESCRIPTION OF THE EMBODIMENTS

Exemplary embodiments of the present invention will be described with reference to the drawings.

<Description of System Configuration>

Figure 1:
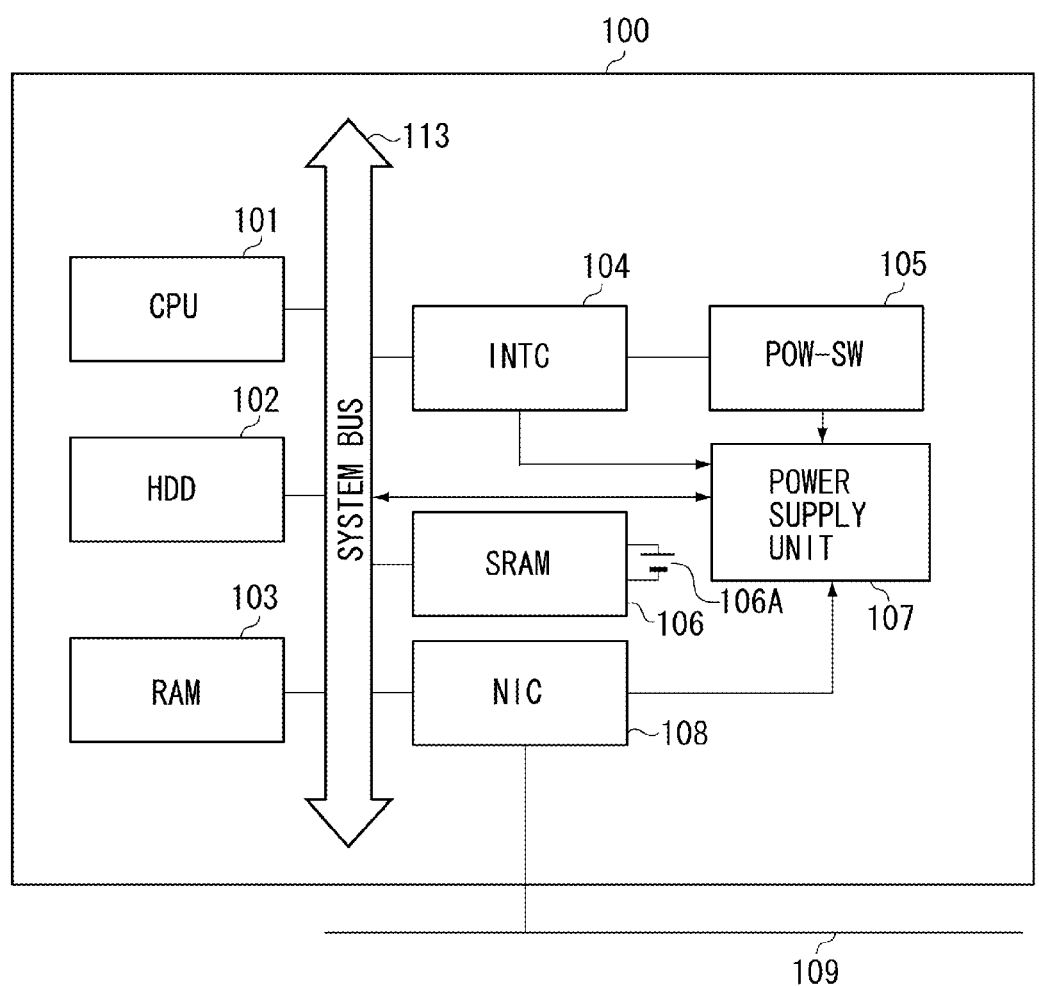
FIG. 1 is a block diagram illustrating a hardware configuration of an information processing apparatus.

A first exemplary embodiment is described below. FIG. 1 is a block diagram illustrating a hardware configuration of an information processing apparatus in the present exemplary embodiment. In the present exemplary embodiment, when the information processing apparatus shifts to the state in which a predetermined data processing request is not accepted, the information processing apparatus performs control to save the information, stored in a volatile storage unit, to a nonvolatile storage unit before shifting to a power saving state. The exemplary embodiments of the present invention may be applied to any information processing apparatus, which has the hibernation mode, regardless of what data processing function the information processing apparatus performs. Therefore, the information processing apparatus includes a personal computer that performs data processing, a data transmission/reception apparatus, a printer apparatus, a scanner apparatus, and a multifunction peripheral having a print function, a scanner function, and a data communication function.

Although the example in which an HDD is used as the nonvolatile storage device is described in the present exemplary embodiment, other nonvolatile storage devices (for example, SSD, USB memory) may also be used.

In FIG. 1, an information processing apparatus 100 includes a central processing unit (CPU) 101 that executes software stored in a hard disk drive (HDD) 102. The CPU 101 integrally controls devices connected to a system bus 113. The CPU 101 performs data processing with specific information about an application stored in a specific region (encryption target area 202 that will be described below) of a volatile storage unit (RAM 103 in the present exemplary embodiment).

The HDD 102 is a nonvolatile storage device that stores software and data and retains their contents even when the power is turned off. The RAM 103 functions as a main memory and a work area of the CPU 101. An interrupt control unit (INTC) 104 is connected to a power switch (POW-SW) 105. When the POW-SW 105 is turned off, a turn-off signal is sent to the INTC 104, via which the CPU 101 can detect that the power is turned off. The POW-SW 105 is also connected to a power supply unit 107 and, when the power is turned on, power is supplied to the entire apparatus. A static random access memory (SRAM) 106, a storage device whose data is retained by a battery 106A, is arranged usually on the controller board. In the present exemplary embodiment, the controller board is a removable component of the information processing apparatus and is connected to the bus. A network interface controller (NIC) 108 is connected to other information processing apparatuses via a network 109 so that the NIC 108 can communicate with those information processing apparatuses. When an instruction is received from the CPU 101 or when the NIC 108 does not receive data for a predetermined period, the power supply unit 107 performs power saving mode control. In the power saving mode, the power supply unit 107 supplies power, not to the devices to which power need not be supplied, but only to the devices required for returning to the data processing. On the other hand, in a low-power state under the power saving mode control, when the NIC 108 receives data or when the power switch (POW-SW) 105 detects an instruction to turn on the power, the power supply unit 107 performs power control for resuming the supply of required power to the devices.

In this case, when an instruction is received via the power switch (POW-SW) 105 to request to shift to a power-off state (shutdown state), the CPU 101 saves the information, which is stored in the RAM 103 and is required to restore the normal state of a running application, to the HDD 102 before the power supply unit 107 stops the supply of power to the CPU 101. On the other hand, when an instruction is received via the power switch (POW-SW) 105 to request to shift to a power-on state, the CPU 101 restores the information, which has been saved to the HDD 102, to the RAM 103 when the power supply unit 107 resumes the supply of power to the CPU 101.

In some cases, confidential information, such as a password, must be entered to start an application. In the present exemplary embodiment, the confidential information is managed in the specific region (encryption target area 202) in the RAM 103 as specific information. When a plurality of applications is running, a plurality of pieces of specific information corresponding thereto is stored.

In addition, when an instruction is received via the power switch (POW-SW) 105 to request to shift to the power-off state, the CPU 101 encrypts the information only in the specific region using a predetermined encryption method when the information in the specific region in the RAM 103 is saved to the HDD 102. After that, the CPU 101 saves the encrypted information, as well as the information required for restarting the application, to the HDD 102. Therefore, the specific information can be encrypted and saved quickly and efficiently.

On the other hand, when an instruction is received via the power switch (POW-SW) 105 to request to shift to the power-on state, the CPU 101 decrypts the information, which has been encrypted and saved to the HDD 102, in the specific region and, after that, restorers the decrypted information to the RAM 103. In addition, the CPU 101 restores the unencrypted and application-related information directly to the RAM 103.

Therefore, the specific information can be decrypted and restored quickly and efficiently.

Figure 2:
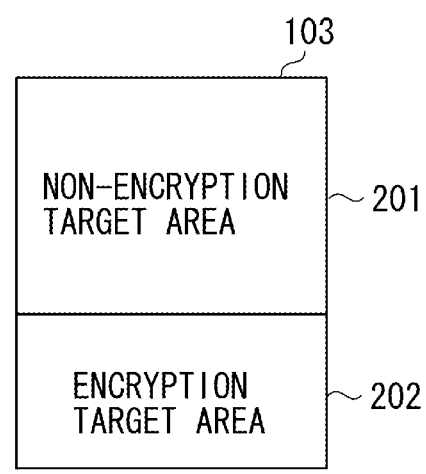
FIG. 2 is a diagram schematically illustrating a logical structure of a random access memory (RAM) illustrated in FIG. 1.

FIG. 2 is a schematic diagram illustrating a logical structure of the RAM 103 illustrated in FIG. 1.

In FIG. 2, a non-encryption target area 201 includes programs that cause the CPU 101 to operate and data that need not be encrypted at the time of hibernation. An encryption target area 202, which corresponds to the specific region, includes confidential information that must be encrypted at the time of hibernation.

For example, when software runs, data is temporarily stored in the RAM 103, in which case the data is stored in the non-encryption target area 201. In that case, when the software processes security-related data such as a password, the data is stored in the encryption target area 202. The power control of the information processing apparatus in the present exemplary embodiment is described below.

Figure 3:
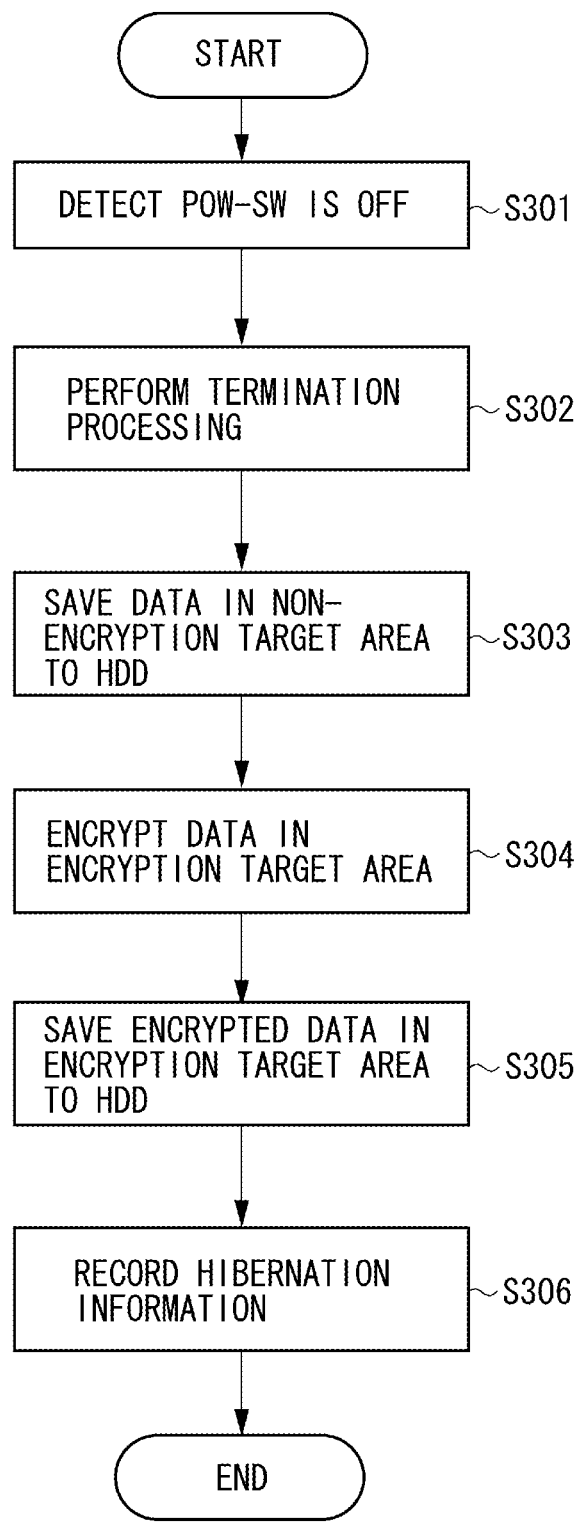
FIG. 3 is a flowchart illustrating a power control method for the information processing apparatus.

FIG. 3 is a flowchart illustrating a power control method for the information processing apparatus in the present exemplary embodiment. This example illustrates an example of processing for encrypting and saving a part of data when the information processing apparatus enters the hibernation state. Each step is implemented by the CPU 101 executing the control program stored in the HDD 102. The present exemplary embodiment describes the hibernation-mode based processing. In particular, the following describes in detail the management processing for confidential information (including information about usage authority) required for the application functions described above, and the saving control and the restoration control of the information associated with the encryption/decryption processing.

In step S301, when the CPU 101 detects via the INTC 104 that the POW-SW 105 is turned off, the processing for entering the hibernation state is started. The processing, though started when the POW-SW 105 is turned off in this example, may also be started when an instruction is entered from an operation unit (not illustrated) or when the signal is received from a timer (not illustrated).

Next, in step S302, the CPU 101 performs the termination processing to retain the various hardware states. In the present exemplary embodiment, the termination processing refers to the processing for terminating the hardware before the power is turned off and for retaining the setting for later use in resetting the setting when the information processing apparatus returns from the hibernation state to the normal power state. The setting is primarily stored in the RAM 103. When the termination processing is terminated, the CPU 101 starts the processing for saving the contents of the RAM 103 to the HDD 102. More specifically, in step S303, the CPU 101 first saves the data in the non-encryption target area 201 to the HDD 102.

Next, in step S304, the CPU 101 encrypts the data in the encryption target area 202. Although there is no particular restriction on the encryption algorithm, a powerful encryption algorithm, if used, tends to require a large area in the RAM 103.

The key information used by the encryption algorithm must be also temporarily stored in the RAM 103. Storing the key information in the RAM 103 requires an additional area in the RAM 103 for the encryption processing; in such a case, the non-encryption target area 201, from which the data has been saved, may be used as the additional area. Although automatically assigned in the present exemplary embodiment, the size and the address of the encryption target area 202 in the RAM 103 may also be changed according to the encryption processing method. The encryption method may be regularly changed.

The length of encrypted data varies according to the encryption algorithm. The non-encryption target area 201, from which data has been saved, may be also used when an encryption algorithm that increases the data length is used.

Finally, in step S305, the CPU 101 saves the encrypted data in the encryption target area 202 to the HDD 102. In step S306, after all of the memory of the RAM 103 is completely saved, the CPU 101 records the hibernation information, which indicates that the data of the RAM 103 has been saved to the HDD 102, and then terminates the processing.

In the processing from step S303 to step S305, the non-encryption target area 201 and the encryption target area 202 are saved separately. If the encryption algorithm does not require the additional area in the RAM 103 during the encryption processing, the processing may be performed in the order of steps S304, S303, and S305.

Figure 4:
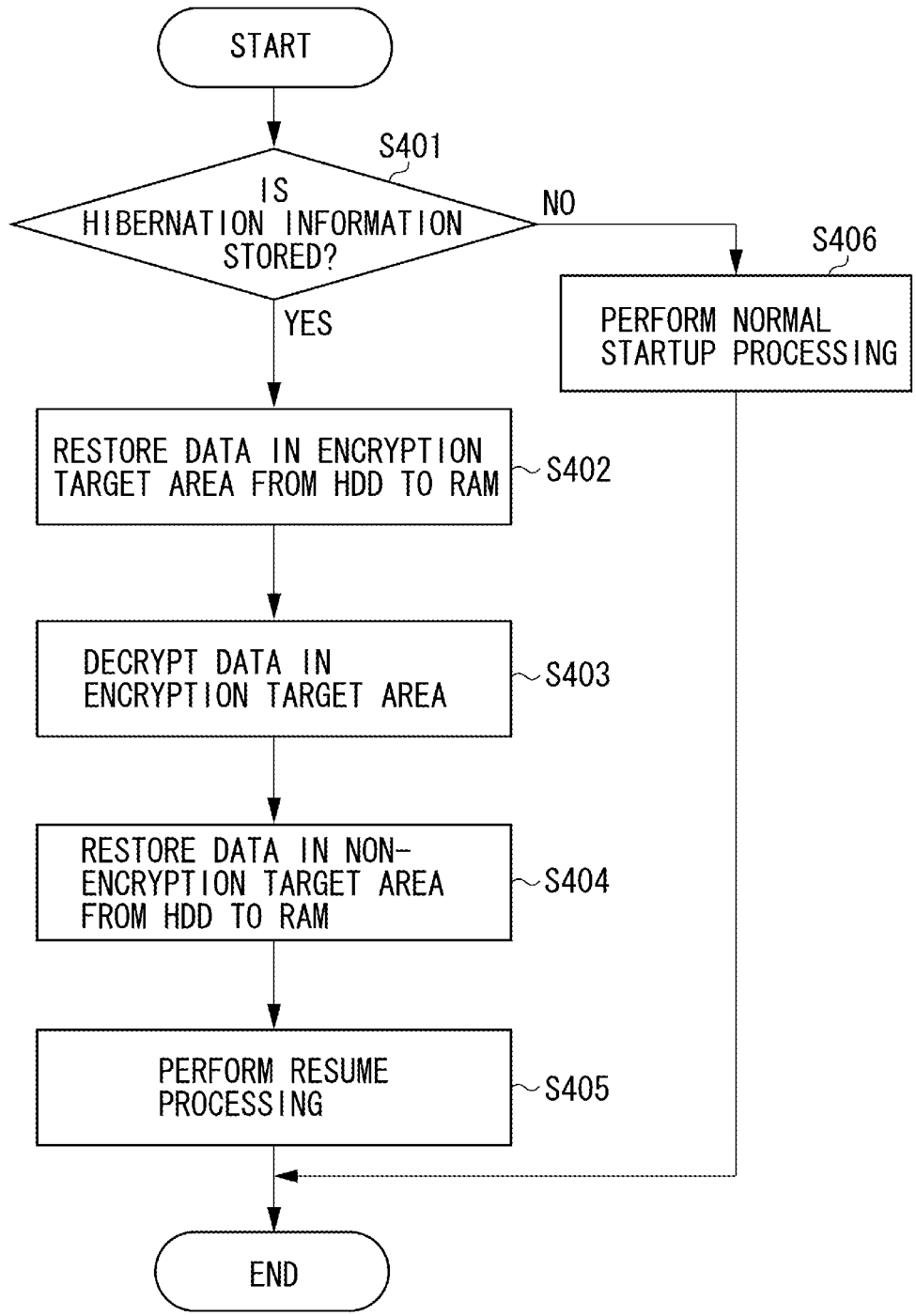
FIG. 4 is a flowchart illustrating a power control method for the information processing apparatus.

FIG. 4 is a flowchart illustrating a power control method for the information processing apparatus in the present exemplary embodiment. This example is an example of processing for returning from the hibernation state. Each step is implemented by the CPU 101 executing the control program stored in the HDD 102. The present exemplary embodiment describes hibernation-mode based processing that is performed when a factor exists that causes the information processing apparatus to return to the normal power state. In particular, the following describes the management processing for the confidential information required for the application functions described above, and the processing related to the encryption/decryption processing.

First, in step S401, when the system is powered on, the CPU 101 determines whether the hibernation information, recorded in step S306, is stored in the HDD 102. If the CPU 101 determines that no hibernation information is stored in the HDD 102 (NO in step S401), the CPU 101 performs the normal startup processing in step S406, terminates the processing, and then shifts to the normal data processing.

The normal startup processing here refers to reading and initialization processing for the operating system stored in the HDD 102, reading and initialization processing for the device drivers, and reading and initialization processing for other software.

On the other hand, in step S401, if the hibernation information is stored in the HDD 102 (YES in step S401), the CPU 101 starts the processing for restoring the information of the RAM 103 saved to the HDD 102.

First, in step S402, the CPU 101 restores the data, which has been stored in the encryption target area 202, from the HDD 102 to the RAM 103.

Next, in step S403, the CPU 101 decrypts the data in the encryption target area 202. As in the encryption processing in step S304, if an additional area is required in the RAM 103 for the processing depending upon the algorithm or if the data length varies, the non-encryption target area 201 may be used.

Finally, in step S404, the CPU 101 restores the data, which has been stored in the non-encryption target area 201, from the HDD 102 to the RAM 103.

At this point, all of the information saved to the HDD 102 is restored.

After that, in step S405, the CPU 101 performs resume processing. The resume processing refers to the processing for initializing each piece of hardware and the processing for setting the setting, which has been retained in the termination processing (step 302 in FIG. 3), on the hardware again.

Figure 5:
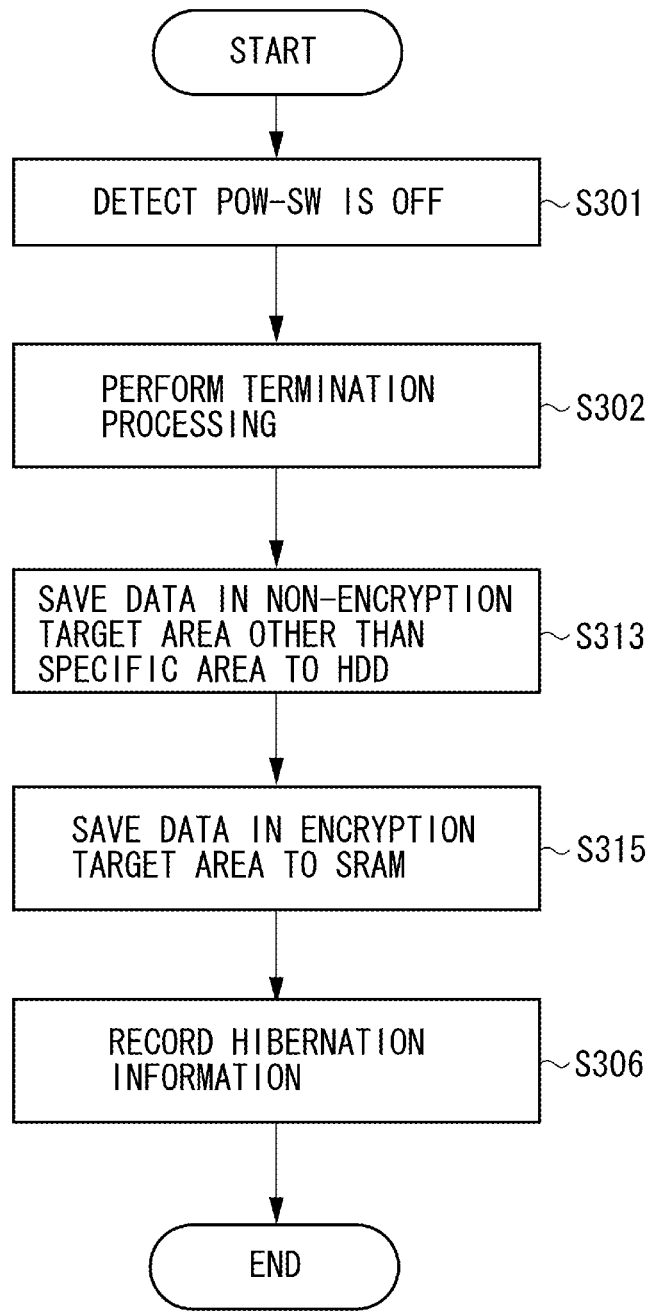
FIG. 5 is a flowchart illustrating a power control method for the information processing apparatus.
Figure 6:
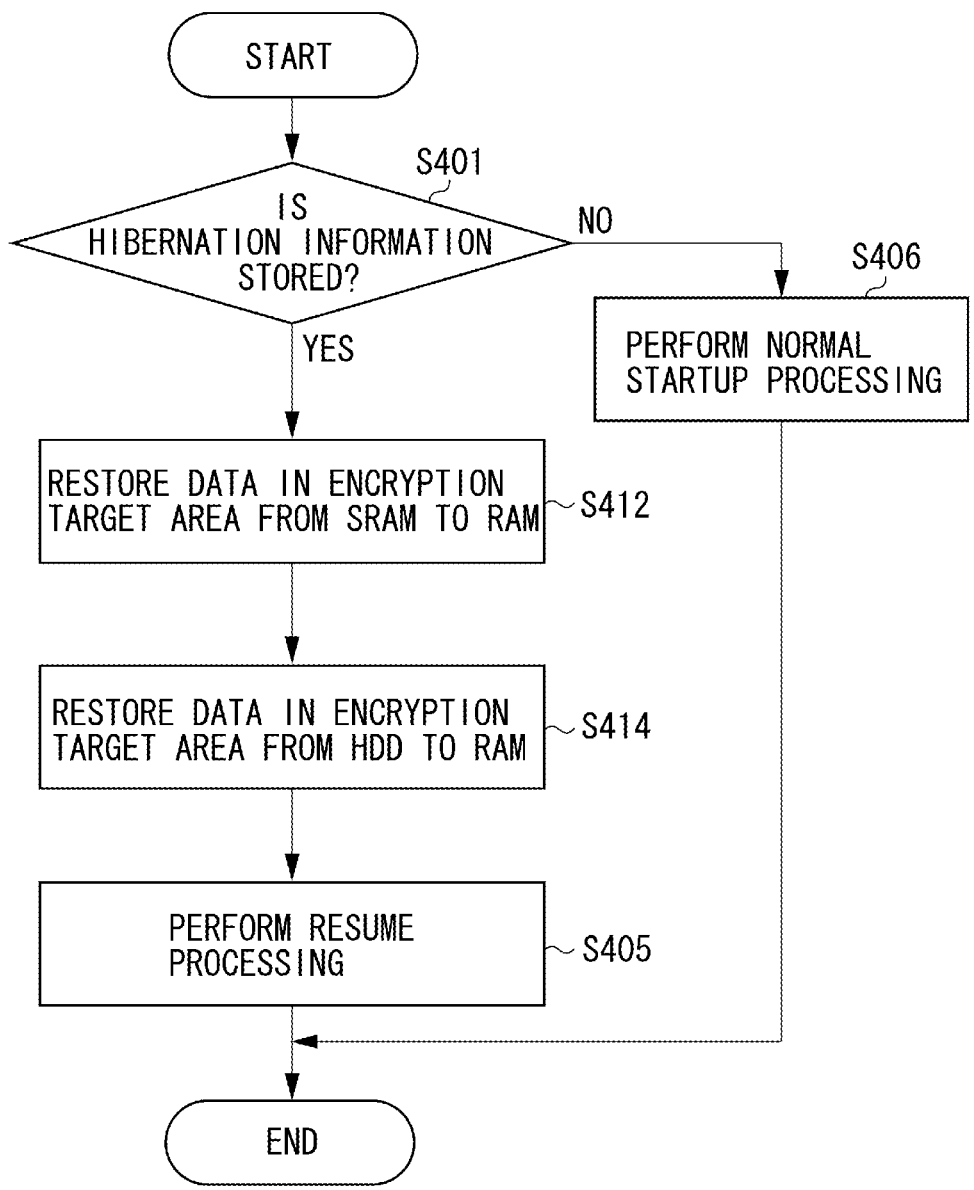
FIG. 6 is a flowchart illustrating a power control method for the information processing apparatus.

Next, a second exemplary embodiment is described. Referring to FIG. 5 and FIG. 6, the present exemplary embodiment is described in which a part of data is saved to a non-removable, nonvolatile storage device when the information processing apparatus enters the hibernation state.

In the present exemplary embodiment, an SRAM 106 illustrated in FIG. 1 is assumed as the non-removable, nonvolatile storage device. The SRAM 106, configured by a semiconductor memory, is usually mounted on the same substrate as the other components including a CPU 101, a RAM 103, an INTC 104, and a POW-SW 105. Therefore, the SRAM 106 is non-removable. An SRAM need not always be used as the non-removable, nonvolatile storage device; any non-removable, nonvolatile storage device may be used.

FIG. 5 is a flowchart illustrating a power control method for the information processing apparatus in the present exemplary embodiment. This example illustrates an example of processing for encrypting and saving a part of data when the information processing apparatus enters the hibernation state. Each step is implemented by the CPU 101 executing the control program stored in the HDD 102. The processing of steps 5301, 5302, and 5306 illustrated in FIG. 5 is similar to the processing in the flowchart illustrated in FIG. 3 and, therefore, the description of those steps is not repeated.

When the termination processing is terminated, the CPU 101 starts the processing for saving the contents of the RAM 103 to the HDD 102. Next, in step S313, the CPU 101 saves the data in the non-encryption target area 201 other than the specific area to the HDD 102. Finally, in step S315, the CPU 101 saves the data in the encryption target area 202 to the SRAM 106 and then terminates the processing.

FIG. 6 is a flowchart illustrating a power control method for the information processing apparatus in the present exemplary embodiment. This example illustrates an example of processing when the information processing apparatus returns from the hibernation state to the normal power state. Each step is implemented by the CPU 101 executing the control program stored in the HDD 102. The processing of steps 5401, 5405, and 5406 illustrated in FIG. 6 is similar to the processing in the flowchart illustrated in FIG. 4 and, therefore, the description of those steps is not repeated. The present exemplary embodiment describes hibernation-mode based processing. In particular, the following describes the management processing for the confidential information required for the application functions described above and the processing related to the encryption/decryption processing.

In step S401, if the CPU 101 determines that the hibernation information is stored (YES in step S401), the CPU 101 starts processing for restoring the information of the RAM 103 saved to the HDD 102. More specifically, in step S412, the CPU 101 restores the data, which has been stored in the encryption target area 202, from the SRAM 106 to the RAM 103. Finally, in step S414, the CPU 101 restores the data, which has been stored in the non-encryption target area 201, from the HDD 102 to the RAM 103 and then terminates the processing.

In the above exemplary embodiment, an example is described in which the hibernation processing is performed when the POW-SW 105 accepts an OFF instruction. However, in an information processing apparatus connected to a network as illustrated in FIG. 1, the exemplary embodiment of the present invention is also applicable to a configuration in which the hibernation processing is implemented by monitoring a job reception status.

The steps according to the exemplary embodiments of the present invention may also be implemented by a processing apparatus (CPU, processor) of a personal computer executing software (programs) acquired via a network or various types of storage media.

The present invention is not limited to the foregoing exemplary embodiments, and many modifications (including an organic combination of the exemplary embodiments) based on the spirit of the present invention are possible and are not excluded from the scope of the present invention.

According to the exemplary embodiments of the present invention, when a factor exists that causes the information processing apparatus to shift from the normal power state to the power saving state, the information, which indicates the state of the information processing apparatus and is stored in the specific region of the volatile storage unit, can be quickly saved to the nonvolatile storage unit while maintaining confidentiality.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-164610 filed Jul. 25, 2012, which is hereby incorporated by reference herein in its entirety.

What is claimed is:

1. A control method for controlling an information processing apparatus including a volatile storage unit and a nonvolatile storage unit, the control method comprising:
   in a case where a factor to shift the information processing apparatus to a state in which the volatile storage unit is in an off state exists,
      encrypting information stored in a specific region in the volatile storage unit,
      storing the encrypted information in the nonvolatile storage unit, and
      storing, in the nonvolatile storage unit in unencrypted form, information stored in a region other than the specific region in the volatile storage unit, and;
   in a case where, after the encrypted information is stored in the nonvolatile storage unit and the volatile storage unit shifts to the off state, a factor to shift the information processing apparatus to a state in which power is supplied to the volatile storage unit exists,
      decrypting the information stored in the nonvolatile storage unit in encrypted form,
      storing the decrypted information in the volatile storage unit, and
      storing, in the volatile storage unit, the information stored in the nonvolatile storage unit in unencrypted form, without decrypting the information stored in the nonvolatile storage unit in unencrypted form.

2. A non-transitory computer-readable storage medium storing a program that causes a computer to execute a control method for controlling an information processing apparatus including a volatile storage unit and a nonvolatile storage unit, the control method comprising:
   in a case where a factor to shift the information processing apparatus to a state in which the volatile storage unit is in an off state exists,
      encrypting information stored in a specific region in the volatile storage unit,
      storing the encrypted information in the nonvolatile storage unit, and
      storing, in the nonvolatile storage unit in unencrypted form, information stored in a region other than the specific region in the volatile storage unit, and;
   in a case where, after the encrypted information is stored in the nonvolatile storage unit and the volatile storage unit shifts to the off state, a factor to shift the information processing apparatus to a state in which power is supplied to the volatile storage unit exists,
      decrypting the information stored in the nonvolatile storage unit in encrypted form,
      storing the decrypted information in the volatile storage unit, and
      storing, in the volatile storage unit, the information stored in the nonvolatile storage unit in unencrypted form, without decrypting the information stored in the nonvolatile storage unit in unencrypted form.

3. An information processing apparatus comprising:

an internally located volatile storage unit in communication with a central bus;

a nonvolatile storage unit in communication with the central bus;

an internally located power supply unit in communication the central bus; and at least one CPU in communication with the central bus, wherein the CPU executes a control method for controlling the information processing apparatus, the control method including:

in a case where a factor to shift the information processing apparatus to a state in which the volatile storage unit is in an off state exists, encrypting information stored in a specific region in the volatile storage unit, and storing the encrypted information in the nonvolatile storage unit, storing, in the nonvolatile storage unit in unencrypted form, information stored in a region other than the specific region in the volatile storage unit, and in a case where, after the encrypted information is stored in the nonvolatile storage unit and the volatile storage unit shifts to the off state, a factor to shift the information processing apparatus to a state in which power is supplied to the volatile storage unit exists, decrypting the information stored in the nonvolatile storage unit in encrypted form, storing the decrypted information in the volatile storage unit, and storing, in the volatile storage unit, the information stored in the nonvolatile storage unit in unencrypted form, without decrypting the information stored in the nonvolatile storage unit in unencrypted form.

4. The information processing apparatus according to claim 3, wherein the nonvolatile storage unit is a hard disk.

5. The information processing apparatus according to claim 3, wherein the nonvolatile storage unit is a semiconductor memory.

6. The information processing apparatus according to claim 3, wherein, in the case where the factor to shift the information processing apparatus to the state in which the volatile storage unit is in the off state exists, key information used by the control unit for the encryption is temporarily stored in the region other than the specific region in the volatile storage unit and is stored in the nonvolatile storage unit in unencrypted form.

7. The information processing apparatus according to claim 3, further comprising an internal power supply unit.

8. The information processing apparatus according to claim 3, wherein the information processing apparatus is a personal computer that performs data processing.

9. The information processing apparatus according to claim 3, wherein the information processing apparatus is a printer apparatus having a print unit.

10. The information processing apparatus according to claim 3, wherein the information processing apparatus is a scanner apparatus having a scanning unit.

* * * * *